(12) United States Patent
Taguchi et al.

(10) Patent No.: US 9,829,412 B2
(45) Date of Patent: Nov. 28, 2017

(54) ROLLING-BEARING TESTING DEVICE (71) Applicant: NSK LTD., Tokyo (JP)

(72) Inventors: Ikuo Taguchi, Fujisawa (JP); Masato Yoshida, Fujisawa (JP)

(73) Assignee: NSK LTD., Tokyo (JP)

( * ) Notice: Subject to any disclaimer, the term of this patent is extended or adjusted under 35 U.S.C. 154(b) by 214 days.

(21) Appl. No.: 14/781,766

(22) PCT Filed: Apr. 4, 2014

(86) PCT No.: PCT/JP2014/060002
§ 371 (c)(1),
(2) Date: Oct. 1, 2015

(87) PCT Pub. No.: WO2014/163192
PCT Pub. Date: Oct. 9, 2014

(65) Prior Publication Data
US 2016/0054198 A1 Feb. 25, 2016

(30) Foreign Application Priority Data

Apr. 5, 2013 (JP) .................. 2013-079791

(51) Int. Cl.
*G01M 13/04* (2006.01)
(52) U.S. Cl.
CPC .......... *G01M 13/045* (2013.01); *G01M 13/04* (2013.01)
(58) Field of Classification Search
CPC ........................... G01M 13/04; G01M 13/045
(Continued)

(56) References Cited

U.S. PATENT DOCUMENTS 5,298,323 A    3/1994  Narai et al.
5,959,189 A *  9/1999  Jeng ...................... G01M 13/04
                                                            73/10
(Continued)

FOREIGN PATENT DOCUMENTS

CN          1401971 A      3/2003
CN     201828227 U    *   5/2011
(Continued)

OTHER PUBLICATIONS

Communication dated Jan. 25, 2017 issued by Korean Intellectual Property Office in counterpart Korean Application No. 10-2015-7027076.
(Continued)

*Primary Examiner* — J M Saint Surin
(74) *Attorney, Agent, or Firm* — Sughrue Mion, PLLC (57) ABSTRACT

A radial rolling-bearing testing device includes a housing, a lubricant reservoir provided inside the housing and configured so as to retain lubricant in which a portion of a radial rolling bearing is immersed, a rotary shaft which is supported so as to freely rotate inside the housing and which an inner ring of the radial rolling bearing is fitted outside, a rotational driving section which is configured so as to rotate the rotary shaft, a load applying section which has a pressurizing device and is configured so as to apply a load to the radial rolling bearing, and a vibration sensor configured so as to detect a vibration in the radial rolling bearing. The vibration sensor is provided on an outside of the housing, and between the pressurizing device and the radial rolling bearing in a direction in which the load applies.

3 Claims, 7 Drawing Sheets (58) Field of Classification Search
USPC .......................................................... 73/593
See application file for complete search history.

(56) References Cited

U.S. PATENT DOCUMENTS

| | | | | |
|---|---|---|---|---|
| 6,000,855 | A * | 12/1999 | Miyazaki | F16C 35/061 |
| | | | | 384/517 |
| 6,293,151 | B1 | 9/2001 | Kawamata et al. | |
| 6,926,446 | B2 * | 8/2005 | Grehn | F16C 19/49 |
| | | | | 384/494 |
| 2002/0108444 | A1 * | 8/2002 | Matsuoka | G01H 1/003 |
| | | | | 73/593 |
| 2003/0030565 | A1 | 2/2003 | Sakatani et al. | |
| 2003/0051549 | A1 * | 3/2003 | Sherman | F16C 19/50 |
| | | | | 73/494 |
| 2006/0145881 | A1 | 7/2006 | Sakatani et al. | |
| 2008/0042503 | A1 * | 2/2008 | Hartkorn | H02K 1/28 |
| | | | | 310/90 |
| 2014/0169715 | A1 * | 6/2014 | Hebrard | F16C 41/00 |
| | | | | 384/448 |
| 2016/0033362 | A1 * | 2/2016 | Taguchi | G01M 13/04 |
| | | | | 73/593 |

FOREIGN PATENT DOCUMENTS

| | | | |
|---|---|---|---|
| CN | 102607849 | A | 7/2012 |
| CN | 202614528 | U | 12/2012 |
| JP | 61119746 | U | 7/1986 |
| JP | 3018355 | B2 | 3/2000 |
| JP | 3448998 | B2 | 9/2003 |
| JP | 2004-233284 | A | 8/2004 |
| JP | 200591212 | A | 4/2005 |
| JP | 2006-29788 | A | 2/2006 |
| JP | 3793888 | B2 | 7/2006 |
| JP | 20073196 | A | 1/2007 |
| JP | 2014202639 | * | 10/2014 |

OTHER PUBLICATIONS

Search Report dated Jun. 24, 2014, issued by the International Searching Authority in counterpart International Application No. PCT/JP2014/060002 (PCT/ISA/210).

Written Opinion dated Jun. 24, 2014, issued by the International Searching Authority in counterpart International Application No. PCT/JP2014/060002 (PCT/ISA/237).

Communication dated May 16, 2017, issued by the State Intellectual Property Office of P.R. China in counterpart Chinese application No. 201480020015.2.

* cited by examiner

ROLLING-BEARING TESTING DEVICE

TECHNICAL FIELD

The present invention relates to a radial rolling-bearing testing device for performing durability evaluation of a radial rolling bearing which is installed on a rotation support section of a vehicle, various machine tools, various industrial machines, and the like.

BACKGROUND ART

Figure 7:
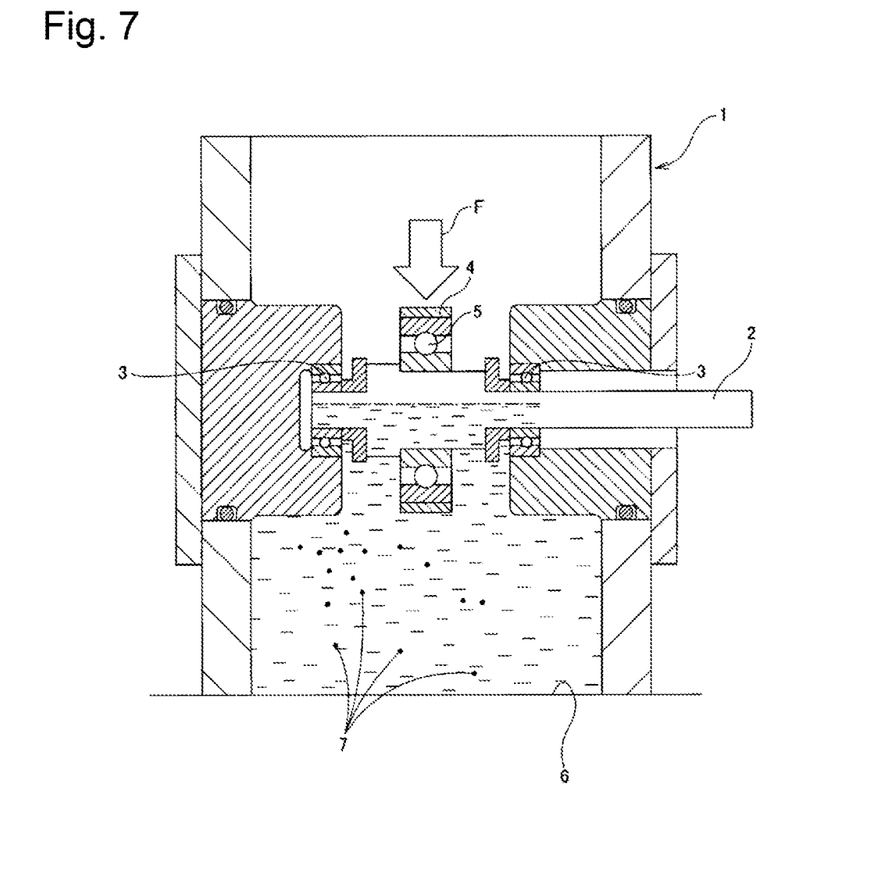
FIG. 7 is a sectional view of a radial rolling-bearing testing device in an example of the related art.

A life of a rolling bearing varies due to a variety of complexly intertwined factors such as a material, a form, a size, a lubricant state, and a load of a bearing ring or a rolling element of the rolling bearing. Accordingly, in order to obtain the rolling bearing which has an appropriate durability according to a use, it is necessary to perform a testing in order to know effects which the various factors exert on the life of the rolling bearing. FIG. 7 illustrates a radial rolling-bearing testing device in an example of the related art (for example, refer to Patent Document 1). In the radial rolling-bearing testing device, a leading end section (the left end section in FIG. 7) and a portion near to a base end of a rotary shaft 2 are rotatably supported inside a fixed housing 1 by a pair of radial rolling bearings 3 and 3 which each are bearings to be tested. A movable housing 4 is disposed concentrically to the rotary shaft 2 in a periphery of a center section of the rotary shaft 2 which is positioned between the radial rolling bearings 3 and 3. The movable housing 4 is provided inside the fixed housing 1 in a state in which a displacement in the radial direction is possible and a displacement in a rotation direction is prevented. Then, a support bearing 5 is provided between an inner peripheral surface of the movable housing 4 and an outer peripheral surface at the center section of the rotary shaft 2. Then, lower half sections of the support bearing 5 and the radial rolling bearings 3 and 3 are immersed in lubricant which is retained in a lubricant reservoir 6 that is provided inside the fixed housing 1. According to the need, foreign matters 7 and 7 such as metal powders and ceramic powders are mixed into the lubricant. A radial load F with a desired value which faces a vertical direction (up-and-down direction in FIG. 7) is freely applied to the movable housing 4 by a pressurizing device such as a hydraulic cylinder.

In a case where a life testing of the radial rolling bearings 3 and 3 is performed, the radial rolling bearings 3 and 3 are pressed in the vertical direction via the movable housing 4, the support bearing 5, and the rotary shaft 2 by pressing the movable housing 4 using the pressurizing device, and the rotary shaft 2 is driven so as to rotate. As a result, the life testing for durability evaluation of the radial rolling bearings 3 and 3 can be performed in a state in which the desired radial load F is applied and rotated at the desired rotation speed.

In a case where the life testing of the radial rolling bearings 3 and 3 is performed using the radial rolling-bearing testing device as described above, vibration values (amplitudes) of the radial rolling bearings 3 and 3 are detected by a vibration sensor, and a point in time, when the vibration values exceed a threshold value that is set in advance, is set as the life of the radial rolling bearings 3 and 3. And then the testing is completed. However, when the vibration sensor is directly attached to the radial rolling bearings 3 and 3 which are bearings to be tested, it requires work to reattach the vibration sensor every time the radial rolling bearings 3 and 3 are replaced, which is troublesome.

Therefore, it is considered that the vibration sensor can be attached to any of the rotary shaft 2, the support bearing 5, and the movable housing 4 which are vibrated in synchronism with the radial rolling bearings 3 and 3. However, in a case where the vibration sensor is attached to any of the rotary shaft 2, the support bearing 5, and the movable housing 4, there is a possibility that splashes of the lubricant which is retained inside the lubricant reservoir 6 splatter on the vibration sensor, and a portion of any of the rotary shaft 2, the support bearing 5, and the movable housing 4 in which the vibration sensor is installed comes to be a high temperature due to heat which is generated by a heater for maintaining an oil temperature of the lubricant at an appropriate temperature. As a result, there is a possibility that errors in the value which is detected by the vibration sensor increase, and the vibration sensor breaks down.

PRIOR ART DOCUMENT

Patent Document

Patent Document 1: JP-A-2007-003196

SUMMARY OF THE INVENTION

Problem to be Solved

The present invention has an object of providing a radial rolling-bearing testing device which is able to prevent a breakdown of the vibration sensor, while securing detection precision of the vibration of the radial rolling bearing.

Means for Solving the Problem

A radial rolling-bearing testing device of the present invention is used in order to perform durability evaluation (life testing) of a radial rolling bearing. The radial rolling bearing which is the target for the life testing includes an outer ring, an inner ring, and a plurality of rolling elements. The outer ring includes an inner peripheral surface that has an outer ring raceway. The inner ring includes an outer peripheral surface which has an inner ring raceway. The rolling elements are provided so as to freely rotate between the outer ring raceway and the inner ring raceway.

According to an aspect of the present invention, the radial rolling-bearing testing device includes a housing, a lubricant reservoir, a rotary shaft, a rotational driving section, a load applying section, and a vibration sensor. The lubricant reservoir is provided inside the housing, and is configured such that lubricant which immerses a portion of the radial rolling bearing is retained. The rotary shaft is supported inside the housing so as to freely rotate, and the inner rings of the radial rolling bearing is fitted around the outside thereof. The rotational driving section is configured so as to rotate the rotary shaft. The load applying section is configured such that one of a radial load and a thrust load is applied to the radial rolling bearing, and includes a pressurizing device which is hydraulic, electric, mechanical, and the like. The vibration sensor is configured so as to detect a vibration of the radial rolling bearing.

The vibration sensor is provided on an outside of the housing, and between the radial rolling bearing and the pressurizing device in relation to a direction in which the load applies. It is preferable that the load is a radial load in a direction which is orthogonal to an axial direction of the rotary shaft (an axial direction of the radial rolling bearing). The housing may be configured so as to support the rotary shaft at two positions which are separated in the axial direction via a pair of radial rolling bearings. The radial rolling-bearing testing device may further include a movable housing which is disposed concentrically to the rotary shaft in a periphery of the rotary shaft, and is provided in a state in which a displacement in a radial direction is possible and a displacement in a rotation direction is prevented with respect to the housing. The radial rolling-bearing testing device may further include a support bearing which is provided between an inner peripheral surface of the movable housing and a portion of an outer peripheral surface of the rotary shaft between the pair of radial rolling bearings. The load applying section may further include a pressing jig which has a base end surface and a leading end surface that abuts against an outer peripheral surface of the movable housing, and a steel ball which is provided between the base end surface of the pressing jig and the leading end surface of a pressing rod of the pressurizing device. A pressing plate of the load applying section may be provided between the base end surface of the pressing jig and the steel ball. The vibration sensor may be attached to a side surface of the pressing plate at a side on which the pressurizing device is installed. It is preferable that a contact area of the base end surface of the pressing jig and the other side surface of the pressing plate is larger than a contact area of the steel ball and an one side surface of the pressing plate. As the pressurizing device, for example, a hydraulic cylinder is provided.

The radial rolling-bearing testing device may be configured such that at a point in time, when a vibration value of a radial rolling bearing that is detected by the vibration sensor exceeds a threshold value that is set to equal or more than 1.5 times and equal to or less than 3 times an initial vibration value at a start of a testing, is set as a life of the radial rolling bearing, and the testing is completed.

Effects of Invention

According to the radial rolling-bearing testing device described above, it is possible to prevent a breakdown of the vibration sensor while securing a detection precision of the vibration of the radial rolling bearing since the vibration sensor is provided on the outside of the housing between the radial rolling bearing which is a bearing to be tested and the pressurizing device of the load applying section in relation to the direction in which the load applies. As a result, it is possible to perform an evaluation in relation to the life of the radial rolling bearing with high reliability.

DESCRIPTION OF EMBODIMENTS

Figure 1:
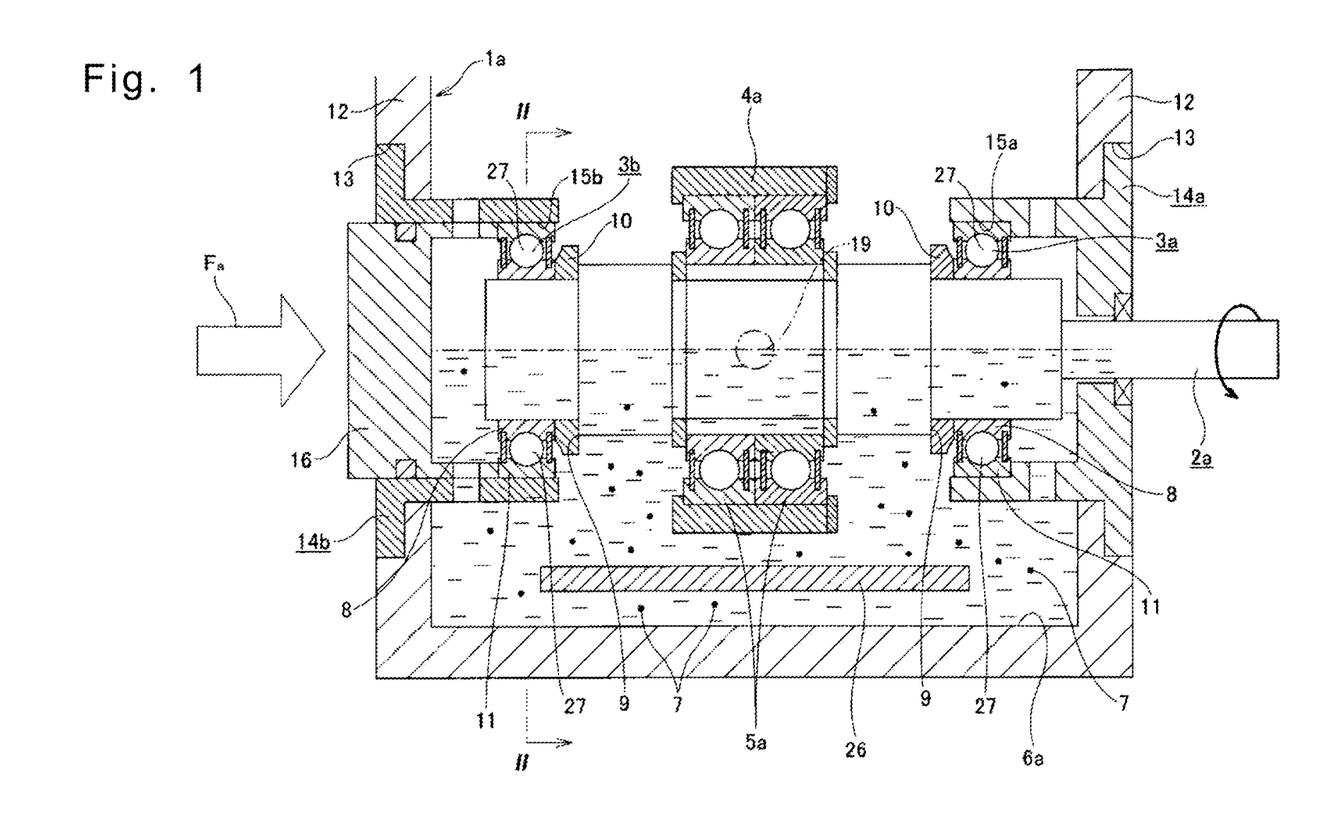
FIG. 1 is a sectional view of a radial rolling-bearing testing device in an embodiment of the present invention.

FIGS. 1 to 3B illustrate a radial rolling-bearing testing device in an embodiment of the present invention. As shown in FIG. 1, a leading end section and a portion near to a base end of a rotary shaft 2a are rotatably supported inside a fixed housing 1a by a pair of radial rolling bearings 3a and 3b which each are bearings to be tested. That is, inner rings 8 and 8 of the radial rolling bearings 3a and 3b are fitted around an outside of the leading end section and a portion near to the base end of the rotary shaft 2a. Inner side surfaces of the inner rings 8 and 8 abut against step sections 9 and 9 which are provided in a center section of the rotary shaft 2a via washers 10 and 10. Outer rings 11 and 11 of the radial rolling bearings 3a and 3b are supported on a pair of axial side wall sections 12 and 12 of the fixed housing 1a which are erected in the vertical direction in a state of being separated in the axial direction of the rotary shaft 2a. Support sleeves 14a and 14b with substantially cylindrical forms are attached to an inside of circular holes 13 and 13 which are provided in the axial side wall sections 12 and 12. Then, the outer rings 11 and 11 are respectively fixed around an inside of support sections 15a and 15b with cylindrical forms which are provided on an inner peripheral surface of leading end sections of the support sleeves 14a and 14b. An outer side surface of the outer ring 11 of the radial rolling bearing 3a abuts against a stepped surface which is provided at a back end section of the support section 15a of the support sleeve 14a. Thereby, the radial rolling bearing 3a is firmly held in the axial direction between an outer side surface of the washer 10 and the stepped surface of the support section 15a of the support sleeve 14a. In contrast to this, an outer side surface of the outer ring 11 of the other radial rolling bearing 3b abuts against a leading end surface of a piston section 16 which is inserted (fitted) into an inside of the other support sleeve 14b displaceably in the axial direction. Thereby, the radial rolling bearing 3b is firmly held in the axial direction between an outer side surface of the washer 10 and the leading end surface of the piston section 16. In the case of the present example, it is possible to apply an axial load Fa with a desired value to the radial rolling bearings 3a and 3b by pressing a base end surface of the piston section 16 using a pressurizing device such as a hydraulic cylinder which is not shown in the drawings.

A movable housing 4a with a substantially cylindrical form is disposed concentrically to the rotary shaft 2a on a periphery of the center section of the rotary shaft 2a. Then, a pair of support bearings 5a and 5a are provided between an inner peripheral surface of the movable housing 4a and an outer peripheral surface at the center section of the rotary shaft 2a. The movable housing 4a is provided inside the fixed housing 1a in a state in which a displacement in the radial direction is possible and a displacement in the rotation direction is prevented. In a case of the present example, it is possible to apply a radial load Fr with a desired value to the movable housing 4a in the horizontal direction. A radial load applying section for applying the radial load Fr in the horizontal direction includes a hydraulic type pressurizing device 30, a pressing jig 19, a steel ball 21, and a pressing plate 22. That is, a leading end section of the pressing jig 19 with a substantially cylindrical form is inserted into a through hole 18 which is provided in a state of passing through a width direction side wall section 17a in the horizontal direction, out of a pair of width direction side wall sections 17a and 17b to which each of end sections of the axial side wall sections 12 and 12 of the fixed housing 1a are connected. A base end surface (a right end surface in FIG. 2) of the pressing jig 19 is abutted by a leading end surface (a left end surface in FIG. 2) of the pressing rod 20 of the pressurizing device 30, which is a hydraulic cylinder and is installed outside the width direction side wall section 17a of the fixed housing 1a, via the steel ball 21 and the pressing plate 22. Then the radial load Fr is applied to the base end surface of the pressing jig 19 in the horizontal direction. A concave section 23 with a tapered concave surface form is provided on an outer side surface (a right end surface in FIG. 2) of the pressing plate 22, and a portion of a surface of the steel ball 21 abuts against an outer peripheral edge of the concave section 23. In this manner, even in a case where a slight deviation is generated between a central axis of the pressing rod 20 of the pressurizing device 30 and a central axis of the pressing jig 19 by devising the contact state (setting circumferential contact) of the pressing plate 22 and the steel ball 21, it is possible to stably apply the radial load Fr to the movable housing 4a regardless of the deviation (by adsorbing the deviation) It is possible to make the base end surface of the pressing jig 19 to abut against the inner side surface of the pressing plate 22 without a gap (except the concave section 24) by providing the concave section 24 with a tapered concave surface form on the center section of the base end surface of the pressing jig 19. Thereby, a contact area of the base end surface of the pressing jig 19 and the inner side surface of the pressing plate 22 is sufficiently larger than a contact area of the steel ball 21 and the outer side surface of the pressing plate 22. Vibration of the radial rolling bearings 3a and 3b (and the support bearings 5a and 5a) is freely detected via the rotary shaft 2a, the support bearings 5a and 5a, the movable housing 4a, and the pressing jig 19 by providing a vibration sensor 25 on the outer side surface of the pressing plate 22 and detecting vibration of the pressing plate 22 using the vibration sensor 25.

Also concerning an axial load applying section for applying the axial load Fa to the radial rolling bearings 3a and 3b, in the same manner as the radial load applying section described above, a configuration is possible such that a leading end surface of a pressing rod of a pressurizing device abuts against an outer side surface of the piston section 16 via a steel ball and a pressing plate.

The rotary shaft 2a is connected to an output shaft of a driving source such as an electric motor directly or via a pulley and a coupling that are spanned by an endless belt, and a rotational driving section for driving the rotary shaft 2a so as to rotate at a desired rotation speed is configured.

In the case of the present example, an entirety of the fixed housing 1a is integrally formed in a substantially rectangular box form which is open upward, by carrying out forging and machining on a carbon steel material. A lubricant reservoir 6a is provided inside the fixed housing 1a, and a bottom surface of the lubricant reservoir 6a is a curved concave surface with a partial cylindrical form which is concentric to the rotary shaft 2a. A radius of a curvature r of the bottom surface of the lubricant reservoir 6a is 0.6 times or more and 2 times or less than an outer diameter D of the radial rolling bearings 3a and 3b (0.6 D≤r≤2D), and is preferably equal to or less than the outer diameter D. A heater 26 is provided on a bottom section of the lubricant reservoir 6a which is normally immersed in the lubricant. In detail, the heater 26 with a plate form is provided between the bottom surface of the lubricant reservoir 6a and outer peripheral surfaces of the movable housing 4a and the support sleeves 14a and 14b. A gap is interposed between a lower surface of the heater 26 and the bottom surface of the lubricant reservoir 6a, and between an upper surface of the heater 26 and the outer peripheral surfaces of the movable housing 4a and the support sleeves 14a and 14b. The heater 26 is curved along the bottom surface of the lubricant reservoir 6a. That is, the upper and lower surfaces of the heater 26 are set as a curved surface with a partial cylindrical form which is concentric to the central axis of the rotary shaft 2a. The lubricant, into which foreign matters 7 and 7 such as metal powders and ceramic powders are mixed at a desired ratio, is retained in the lubricant reservoir 6a. For this reason, a mixing ratio of the foreign matters 7 and 7 in the lubricant is not varied from a start of an actual testing to an end of the actual testing. Then, the lubricant is stirred according to rotations of the rotary shaft 2a, the radial rolling bearings 3a and 3b, and the support bearings 5a and 5b, and the foreign matters 7 and 7 are uniformly dispersed within the lubricant. A rectifying means for making a lubricant flow inside the lubricant reservoir 6a appropriate may be provided inside the lubricant reservoir 6a.

In a case where the durability testing (life testing) of the radial rolling bearings 3a and 3b which are bearings to be tested is performed by the radial rolling-bearing testing device described above, taking a stirring effect by the rotary shaft 2a and a lubricity of a load zone into consideration, it is preferable to regulate an oil level of the lubricant which is retained inside the lubricant reservoir 6a within a range from a lower end section to an upper end section of the rotary shaft 2a in a state before the rotary shaft 2a is driven so as to rotate. That is, when the oil level (upper surface) of the lubricant is set below the lower end section of the rotary shaft 2a, the stirring effect by the rotary shaft 2a cannot be obtained, and conversely, when the oil level (upper surface) of the lubricant is set above the upper end section of the rotary shaft 2a, a large portion of the load zone is immersed in the lubricant, it becomes difficult for effects of the foreign matters to be noticed, and the testing time increases. Therefore, in the case of the present example, the oil level of the lubricant is retained so as to be positioned on the central axis of the rotary shaft 2a. Then, in the state before the rotary shaft 2a is driven so as to rotate, only the lower half sections of the radial rolling bearings 3a and 3b are immersed in the lubricant. Thereby, during the life testing, there is a state in which at least a lower end section of the outer peripheral surface of the rotary shaft 2a is immersed in the lubricant, and portions of at least one third from the lower ends of the radial rolling bearings 3a and 3b in the radial direction are immersed in the lubricant. Then, an oil temperature of the lubricant is maintained at a desired temperature (for example, 100° C.) by the heater 26. In the case of the present example, since the oil level of the lubricant is positioned on the central axis of the rotary shaft 2a in the state before the rotary shaft 2a is driven so as to rotate, also during the life testing, the rotary shaft 2a and the radial rolling bearings 3a and 3b are easily maintained within a predetermined temperature range. The rotary shaft 2a is pressed in the axial direction by pressing the base end surface of the piston section 16, and the desired axial load Fa is applied to the radial rolling bearings 3a and 3b. Furthermore, the rotary shaft 2a is pressed in the horizontal direction by pressing the outer peripheral surface of the movable housing 4a using the pressing rod 20, and the desired radial load Fr is applied to the radial rolling bearings 3a and 3b. In this state, the rotary shaft 2a is driven so as to rotate at a desired rotation speed such that rotation (revolution) directions of balls 27 and 27 of the radial rolling bearings 3a and 3b are directions which pass the load zone (a portion illustrated by a thick line in FIG. 2), which is positioned in front of a direction in which the radial load Fr applies, from below to above (a clockwise direction in FIG. 2) in relation to a circumferential direction of the radial rolling bearings 3a and 3b. As a result, the radial rolling bearings 3a and 3b are driven so as to rotate at a desired rotation speed while the desired radial load Fr and axial load Fa are applied. In this state, at a point in time, when vibration values (amplitudes) of the radial rolling bearings 3a and 3b which are detected by the vibration sensor 25 exceed a threshold value that is set to equal or more than 1.5 times and less than 3 times (for example, 2 times) an initial vibration value at the start of the testing, is set as the life of the radial rolling bearings 3a and 3b, and the testing is completed. In a case where the threshold value is less than 1.5 times the initial vibration value, there is a possibility that the testing is completed due to the vibration based on a damage other than to the radial rolling bearings 3a and 3b. In a case where the threshold value is 3 or more times, there is a possibility that the damage progresses widely, and it is not possible to specify a part which is an origin of the damage. When replacing the radial rolling bearings 3a and 3b, in a state in which the support sleeves 14a and 14b are displaced outward in the axial direction, a replacement of the radial rolling bearings 3a and 3b is performed from both sides in the axial direction of the rotary shaft 2a.

According to the radial rolling-bearing testing device described above, since the vibration sensor 25 is provided on the pressing plate 22, it is possible to prevent a breakdown of the vibration sensor 25, while securing detection precision of the radial rolling bearings 3a and 3b which are bearings to be tested. That is, since the vibration sensor 25 is attached to the pressing plate 22 which is provided in series to the direction in which the radial load Fr applies, it is possible to secure a detection precision of the vibration of the radial rolling bearings 3a and 3b. Furthermore, in the case of the present example, the inner side surface of the pressing plate 22 at the radial rolling bearings 3a and 3b side and the base end surface of the pressing jig 19 are abutted without a gap (except for the concave section 24 which is provided in the center section of the base end surface) in the direction in which the radial load Fr applies, and the contact area of the base end surface of the pressing jig 19 and the inner side surface of the pressing plate 22 is larger than the contact area of the steel ball 21 and the outer side surface of the pressing plate 22. Therefore it is possible for the vibration which reaches the pressing jig 19 via the outer peripheral surface of the movable housing 4a to reach the pressing plate 22 with good efficiency. Accordingly, it is possible to enhance the detection precision of the vibration. Since the vibration sensor 25 is provided outside the fixed housing 1a, it is possible to prevent splashes of the lubricant from splattering on the vibration sensor 25, and the temperature becoming high due to generation of heat in the heater 26. Thereby, it is possible to prevent errors in the value which is detected by the vibration sensor 25 from increasing, and the vibration sensor 25 from breaking down.

In the case of the present example, only the lower half sections of the radial rolling bearings 3a and 3b are immersed in the lubricant, and the radial load Fr is applied to the radial rolling bearings 3a and 3b in the horizontal direction. Furthermore, the rotation direction of the rotary shaft 2a is regulated such that the balls 27 and 27 of the radial rolling bearings 3a and 3b are rotated (revolved) in a direction which passes the load zone from below to above. For this reason, it is possible to set an appropriate state of the lubrication of the load zone which is positioned in front of the direction in which the radial load Fr applies, and it is possible to prevent an increasing of the variance of the testing results due to the lubricant in the load zone tending to be insufficient or depleted, and an increasing of a testing time due to the lubricant state being in excess. Furthermore, since the revolving direction of each of the balls 27 and 27 is regulated, it is also possible to appropriately feed the foreign matters 7 and 7, which is mixed in the lubricant that is retained inside the lubricant reservoir 6a, to the load zone, and from this perspective, the testing results are also made stable (the variance is suppressed).

Figure 2:
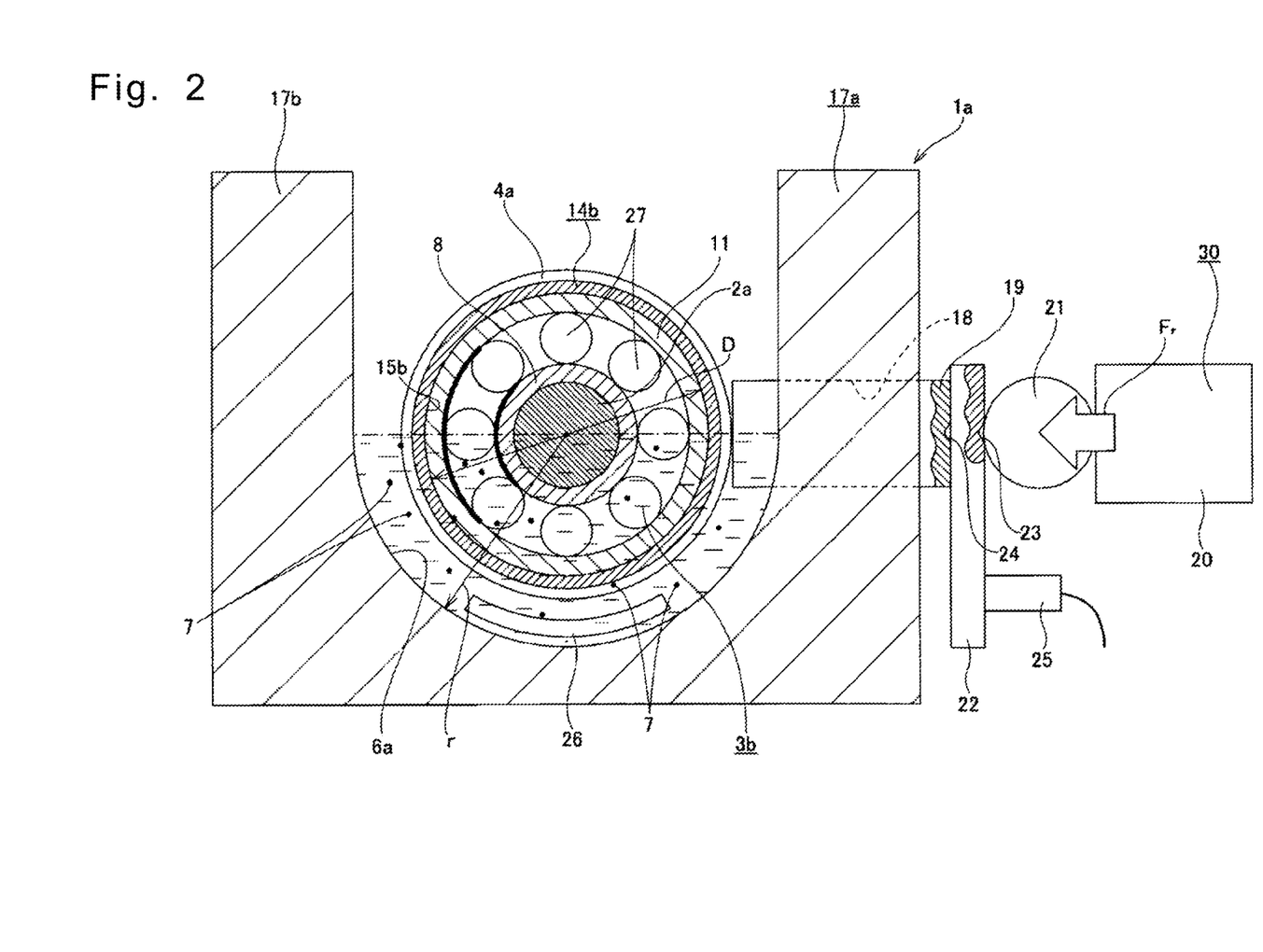
FIG. 2 is a schematic view including a sectional view along line II-II in FIG. 1.
Figure 3A:
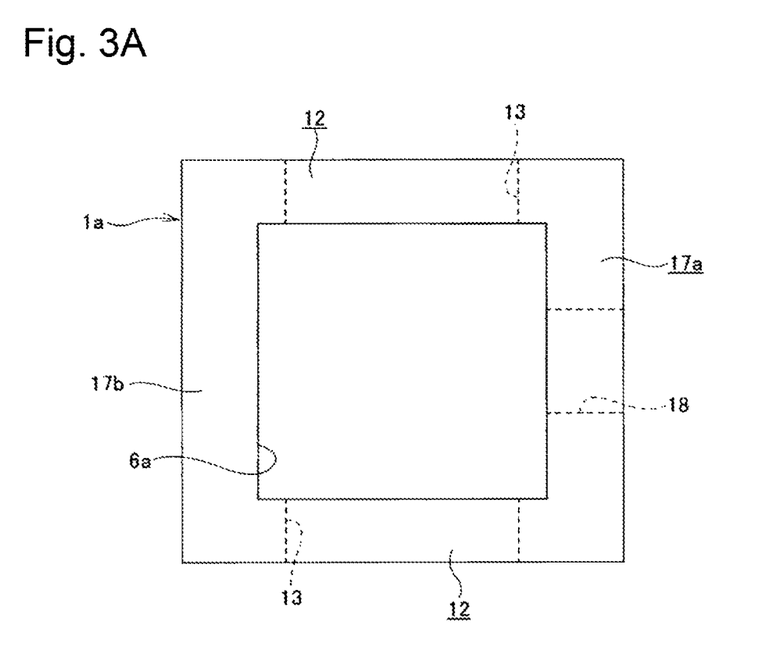
FIG. 3A is a planar view taking out and illustrating a fixed housing.
Figure 3B:
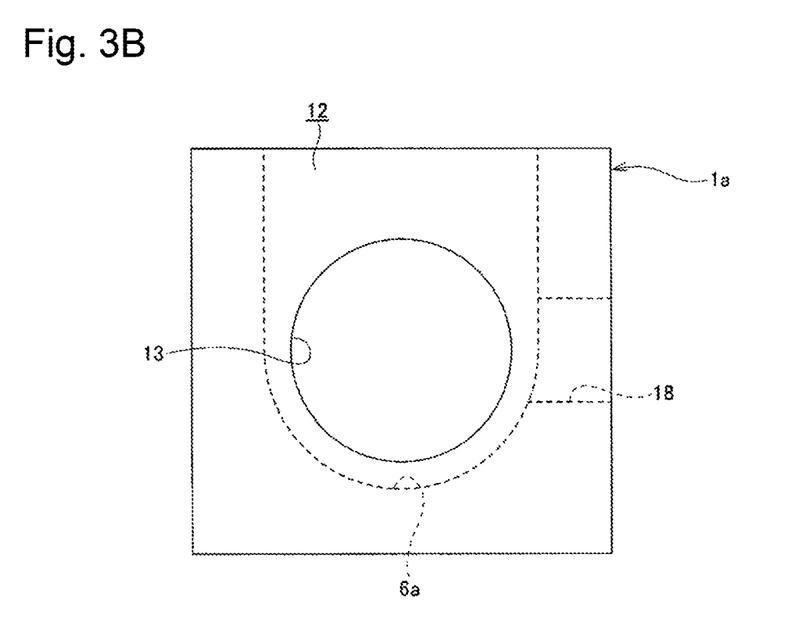
FIG. 3B is a side surface view of the fixed housing.
Figure 4A:
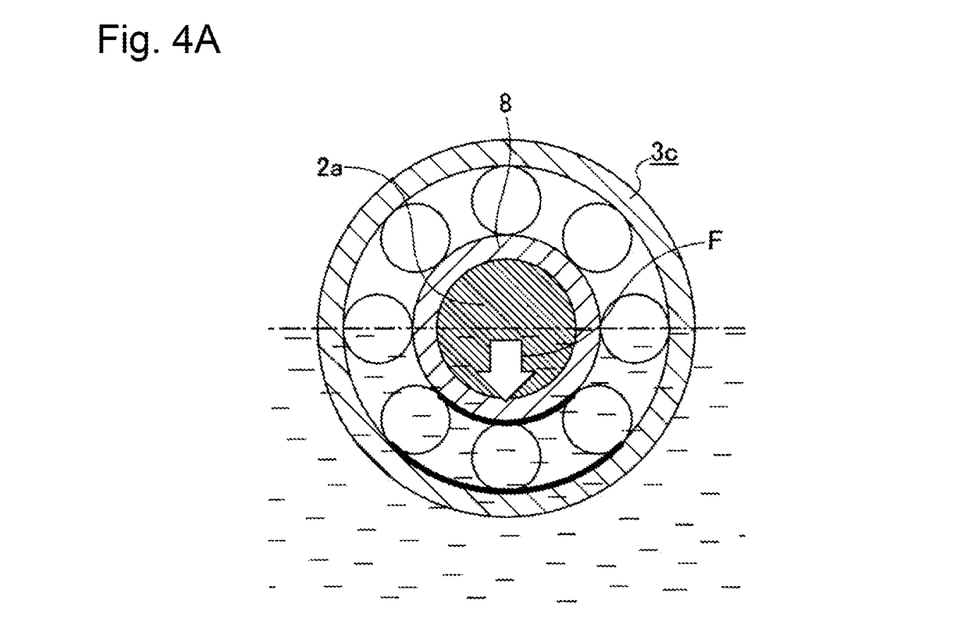
FIG. 4A is a sectional view for describing a problem of applying a radial load in the vertical direction.
Figure 4B:
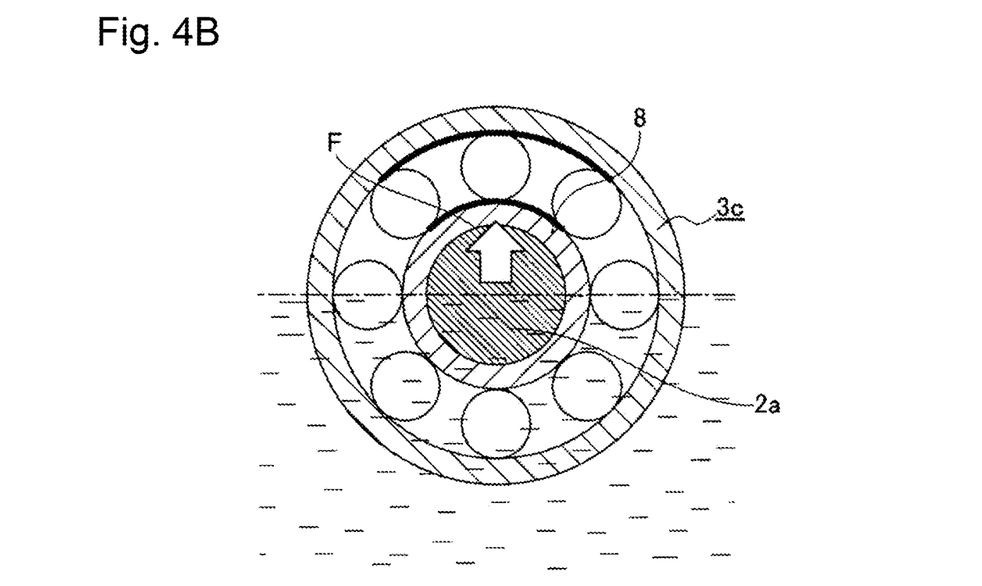
FIG. 4B is another sectional view for describing the problem of applying a radial load in the vertical direction.

The points described above will be described using FIGS. 4A to 5B in addition to FIG. 2. FIG. 4A and FIG. 4B illustrate a structure in which the radial load is applied in the vertical direction to a radial rolling bearing 3c, which is a bearing to be tested, in the same manner as the example of the related art described above. First, in a case where the inner ring 8 of the radial rolling bearing 3c is pressed downward in the vertical direction via the rotary shaft 2a, as shown in FIG. 4A, a lower end section (a portion illustrated by a thick line) of the radial rolling bearing 3c is the load zone. That is, a radial load F is applied to the lower end section. Since the lower half section of the radial rolling bearing 3c is immersed in the lubricant, the lubricant state of the load zone is excessive (excessively enhanced), and the testing time increases. Meanwhile, an upper end section of the support bearing 5 (refer to FIG. 7) becomes the load zone, and the lubricant in the load zone tends to be insufficient or depleted. As a result, a life of the support bearing 5 shortens, and it is necessary to frequently replace the support bearing 5. There is a possibility that the life of the support bearing 5 becomes shorter than the life of the radial rolling bearing 3c, and the life testing of the radial rolling bearing 3c is not normally performed. In contrast to this, in a case where the inner ring 8 of the radial rolling bearing 3c is pressed upward in the vertical direction via the rotary shaft 2a, as shown in FIG. 4B, the upper end section (a portion illustrated by a thick line) of the radial rolling bearing 3c is the load zone. That is, the radial load F is applied to the upper end section. Since the lubricant tends to be insufficient or depleted in the upper end section which is the load zone, in a case where the life testing is performed, there is a possibility that the testing results vary greatly due to whether or not splashes of the lubricant splatter on the upper end section of the radial rolling bearing 3c for some reason. Such variation is remarkable in a case where the foreign matters 7 and 7 are mixed into the lubricant.

Figure 5A:
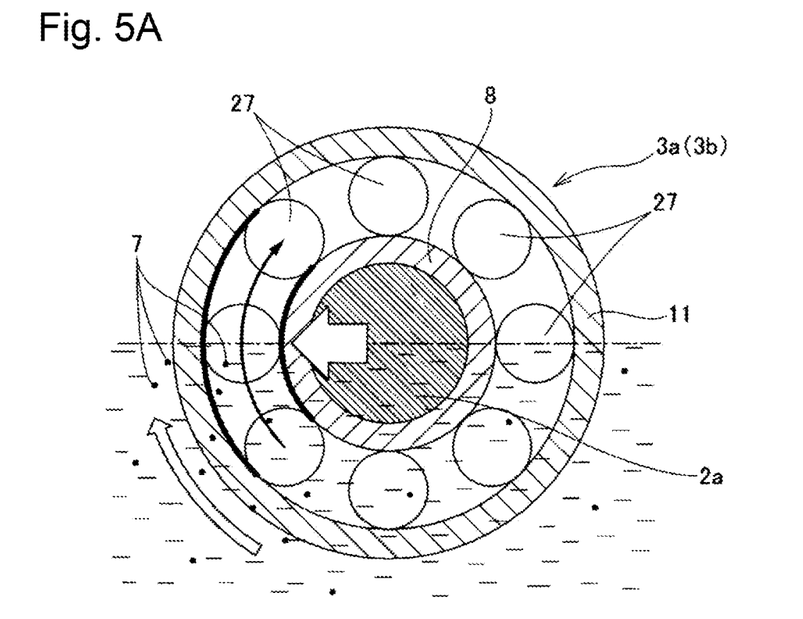
FIG. 5A is a sectional view for describing the effect of regulating the rotary shaft in the rotation direction.
Figure 5B:
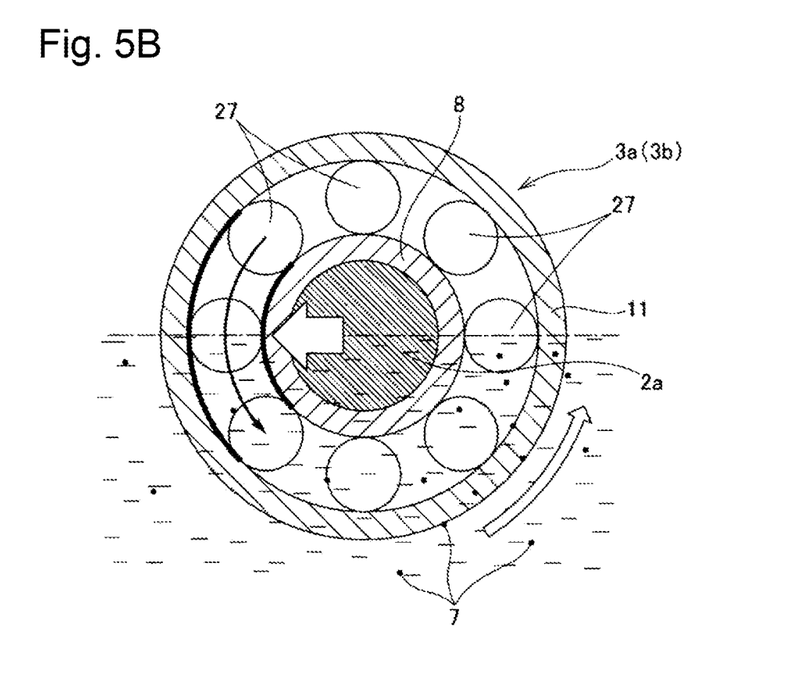
FIG. 5B is another sectional view for describing the effect of regulating the rotary shaft in the rotation direction.

In contrast to this, in a case where the radial load Fr is applied in the horizontal direction to the radial rolling bearings 3a and 3b, and the revolving direction of each ball 27 and 27 is set as a direction which passes the load zone from below to above, as shown in FIG. 5A, it is possible to cause a flow from the bottom section of the lubricant reservoir 6a to the load zone in lubricant oil. As a result, in the load zone, even in a portion which is not immersed in the lubricant, since it is possible to cause a portion of the lubricant to splatter, it is possible to spread the lubricant well, and it is possible to perform the testing stably. It is possible to appropriately feed the foreign matters 7 and 7 which are mixed in the lubricant to the load zone. Meanwhile, in a case where the revolving direction of each of the balls 27 and 27 is set as a direction which passes the load zone from above to below, as shown in FIG. 5B, it is possible to cause a flow facing an opposite side to the load zone in relation to the circumferential direction of the radial rolling bearing 3a (3b) in the lubricant oil. Therefore, in the load zone, the lubricant is insufficient in a portion which is not immersed in the lubricant. Accordingly, in the portion (range) in which the lubricant is insufficient, the lubricant state is varied due to an effect of a slight splash, and the testing results are caused to vary. It is not possible to feed an appropriate amount of the foreign matters 7 and 7 to the load zone (the foreign matters 7 and 7 accumulate at a non-load zone side due to the flow of the lubricant). In the state before the rotary shaft 2a is driven so as to rotate, since the oil level of the lubricant is positioned on the central axis of the rotary shaft 2a, by lubricating an abutting section of the outer peripheral surface of the movable housing 4a and the leading end surface of the pressing jig 19, it is possible to prevent a generation of fretting between the surfaces. Furthermore, since at least a lower end section of the outer peripheral surface of the rotary shaft 2a is immersed in the lubricant, it is possible to suppress a temperature variance of a member, which is disposed inside the fixed housing 1a, such as the radial rolling bearings 3a and 3b and the rotary shaft 2a.

Figure 6:
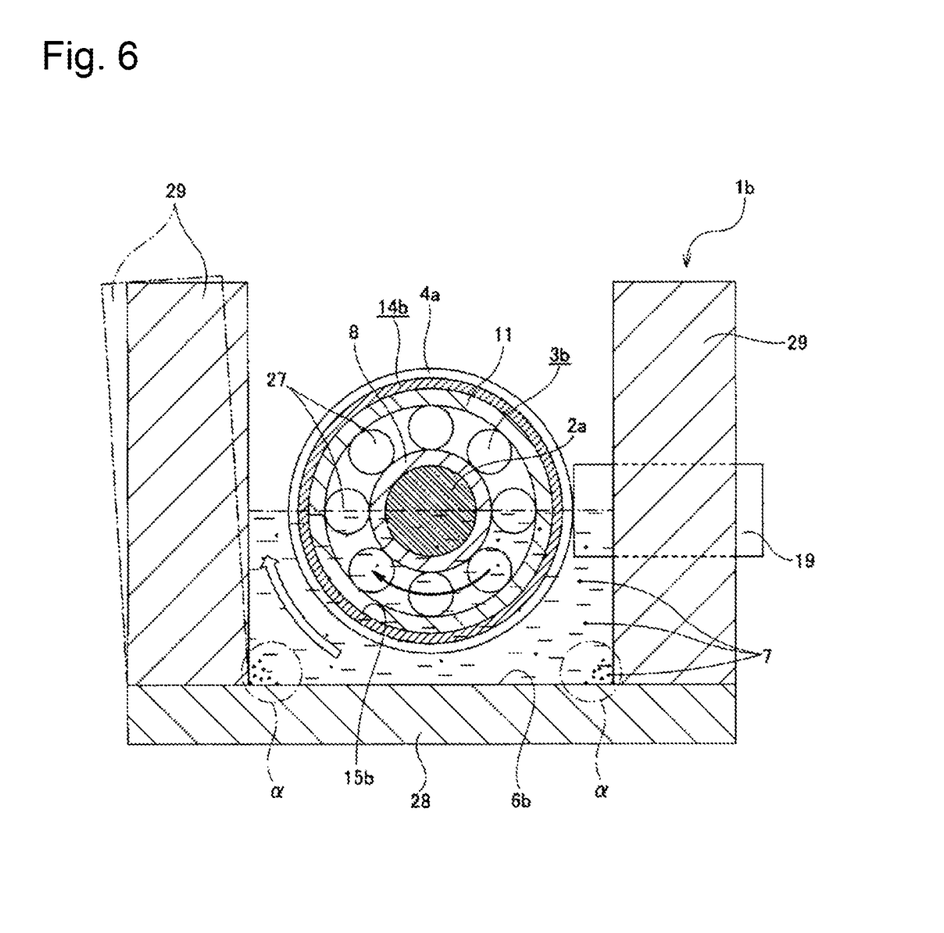
FIG. 6 is a view illustrating a comparative example for describing the effect of integrally forming the fixed housing.

In the case of the present example, in the life testing of the radial rolling bearings 3a and 3b, it is possible to prevent the lubricant from stagnating inside the lubricant reservoir 6a, and the properties of the lubricant are uniformized over an entirety inside the lubricant reservoir 6a. That is, since the bottom surface of the lubricant reservoir 6a is set as a curved concave surface with a partial cylindrical form which is concentric to the rotary shaft 2a, it is possible to prevent the lubricant and the foreign matters 7 and 7 having various large and small sizes which are mixed in the lubricant from stagnating (accumulating) in the lubricant reservoir 6a. As in the structure shown in FIG. 6, in a case where the bottom surface of the lubricant reservoir 6b is a flat surface, the lubricant and the foreign matters 7 and 7 are easily stagnated in corner sections (α sections in FIG. 6). When the lubricant reservoir 6a is cleaned, it is possible to prevent the foreign matters 7 and 7 from adhering to and remaining in the corner sections. Furthermore, in the case of the present example, the heater 26 between the bottom surface of the lubricant reservoir 6a and the outer peripheral surfaces of the movable housing 4a and the support sleeves 14a and 14b is provided in a state in which a gap is respectively interposed between each surface and the upper and lower surfaces of the heater 26. For this reason, it is possible to increase a flow speed of the lubricant at both of the upper and lower sides of the heater 26 based on a throttle of a flow path, and it is possible to make it more difficult for the lubricant and the foreign matters 7 and 7 to be stagnated. It is possible to perform a heat replacement of the lubricant with good efficiency. In particular, in the case of the present example, since the radius of the curvature r of the bottom surface of the lubricant reservoir 6a is 0.6 times or more and 2 times or less than the outer diameter D of the radial rolling bearings 3a and 3b (0.6 D≤r≤2D), it is possible to enhance the circulation of the lubricant without increasing a required quantity of the lubricant. Furthermore, if the radius of the curvature r is equal to or less than the outer diameter D (r≤D), it is possible to reduce the quantity of the lubricant. That is, in a case where the radius of the curvature r is greater than 2 times the outer diameter D (r>2D), it is necessary to increase the quantity of the lubricant. Meanwhile, in a case where the radius of the curvature r is less than 0.6 times the outer diameter D (r<0.6D), the gaps at both of the upper and lower sides of the heater 26 are narrowed excessively, and the circulation of the lubricant is reduced. By providing the gaps at both of the upper and lower sides of the heater 26, it is possible to widen the contact area of the upper and lower surfaces of the heater 26 and the lubricant, and it is possible to adjust the temperature of the lubricant with good efficiency. Since the surface of the lubricant reservoir 6a is made to be smoothly continuous by setting the bottom surface of the lubricant reservoir 6a as a curved concave surface, the surface of the lubricant reservoir 6a is able to uniformly absorb or disperse a heat, and it is possible to prevent a temperature variance. In detail, it is possible to adjust the temperature of the lubricant, which is retained inside the lubricant reservoir 6a, within a desired temperature range of ±3° C.

Furthermore, in the case of the present example, since the entirety of the fixed housing 1a is integrally formed, it is possible to increase a rigidity with respect to the radial load Fr and the axial load Fa. This point will be described using FIG. 6 which illustrates a structure according to a comparative example in addition to FIG. 2. A fixed housing 1b with a rectangular box form which is open upward has a lubricant reservoir 6b therein. A pair of side plate sections 29 and 29 which are parallel to each other, and a pair of end plate sections which connect end sections of the side plate sections 29 and 29 are formed so as to be supportedly fixed to an end plate section 28 with a flat plate form by respective welds and the like. For this reason, in a case where the radial load Fr which is applied to the rotary shaft 2a in the horizontal direction is increased, there is a possibility that the side plate sections 29 and 29 of the fixed housing 1b deform in a direction that falls toward a direction in which the radial load Fr applies. As a result, there is a possibility that a variance of testing results of the testing is increased since it is not possible to normally apply the radial load Fr to the radial rolling bearings 3a and 3b. In contrast to this, in the case of the present example, since the entirety of the fixed housing 1a is integrally formed, and the rigidity of the radial load Fr is increased, it is possible to prevent a variance of testing results by normally applying the radial load Fr to the radial rolling bearings 3a and 3b. Since there are no joints formed by combining a plurality of plate members on the inside surface of the lubricant reservoir 6a, it is possible to enhance an heat transferability. Furthermore, when the inside of the lubricant reservoir 6a is cleaned, the foreign matters 7 and 7 are not stagnated in the joint by adhesion (catching). Also from this perspective, it is possible to suppress a variation of testing results by uniformly maintaining properties of the lubricant.

INDUSTRIAL APPLICABILITY

In the embodiment described above, a structure is described in which a vibration sensor is provided between a radial rolling bearing which is a bearing to be tested, and a pressing rod of a pressurizing device in relation to the direction in which the radial load applies. However, in a case where the bearing to be tested is a ball bearing that can also support the axial load in addition to the radial load, and a life testing is performed by applying only the axial load without applying the radial load, the vibration sensor may be provided between the ball bearing and a pressurizing device for applying the axial load in relation to the direction in which the axial load applies. In the case of the embodiments of the present invention, an attachment section for attaching the vibration sensor to the base end section of a pressing jig may be provided by integrally forming the pressing jig and a pressing plate.

The present invention is based on Japanese Patent Application No. 2013-079791 filed on Apr. 5, 2013, the contents of which are incorporated herein by reference.

REFERENCE SIGNS LIST 1, 1a, 1b FIXED HOUSING
2, 2a ROTARY SHAFT
3, 3a to 3c RADIAL ROLLING BEARING
4, 4a MOVABLE HOUSING
5, 5a SUPPORT BEARING
6, 6a, 6b LUBRICANT RESERVOIR
7 FOREIGN MATTER
8 INNER RING
11 OUTER RING
14a, 14b SUPPORT SLEEVE
19 PRESSING JIG
20 PRESSING ROD
21 STEEL BALL
22 PRESSING PLATE
25 VIBRATION SENSOR
27 BALL
30 PRESSURIZING DEVICE

The invention claimed is:

1. A radial rolling-bearing testing device for performing a testing of a bearing life of a radial rolling bearing which includes an outer ring that has an inner peripheral surface on which an outer ring raceway is formed, an inner ring that has an outer peripheral surface on which an inner ring raceway is formed, and a plurality of rolling elements which are provided so as to freely rotate between the outer ring raceway and the inner ring raceway, the device comprising:
a housing;
a lubricant reservoir which is provided inside the housing and which is configured so as to retain lubricant in which a portion of the radial rolling bearing is immersed;
a rotary shaft which is supported so as to freely rotate inside the housing and which the inner ring of the radial rolling bearing is fitted outside;
a rotational driving section which is configured so as to rotate the rotary shaft;
a load applying section which includes a pressurizing device and is configured so as to apply a load to the radial rolling bearing; and
a vibration sensor which is configured so as to detect a vibration in the radial rolling bearing,
wherein:
the vibration sensor is provided on an outside of the housing, and between the pressurizing device and the radial rolling bearing in a direction in which the load applies,
the housing is configured so as to support the rotary shaft at two positions, which are separated in the axial direction, via a pair of radial rolling bearings, the device further comprises:
a movable housing which is disposed concentrically to the rotary shaft in a periphery of the rotary shaft and which is provided in a state where a displacement in a radial direction is possible and a displacement in a rotation direction is prevented with respect to the housing; and
a support bearing which is provided between an inner peripheral surface of the movable housing and a portion of an outer peripheral surface of the rotary shaft between the pair of radial rolling bearings,
the pressurizing device includes a pressing rod which has a leading end surface,
the load applying section further includes a pressing jig which has a base end surface and a leading end surface that abuts against an outer peripheral surface of the movable housing, and a steel ball which is provided between the base end surface of the pressing jig and the leading end surface of the pressing rod,
the load applying section further includes a pressing plate,
the pressing plate is provided between the base end surface of the pressing jig and the steel ball,
the vibration sensor is attached to a side surface of the pressing plate at a side at which the pressurizing device is installed,
the load is a radial load in a direction which is orthogonal to an axial direction of the rotary shaft, and
a contact area of the base end surface of the pressing jig and the other side surface of the pressing plate is larger than a contact area of the steel ball and one side surface of the pressing plate.

2. The radial rolling-bearing testing device according to claim 1,
wherein the pressurizing device is a hydraulic cylinder.

3. A radial rolling-bearing testing device for performing a testing of a bearing life of a radial rolling bearing which includes an outer ring that has an inner peripheral surface on which an outer ring raceway is formed, an inner ring that has an outer peripheral surface on which an inner ring raceway is formed, and a plurality of rolling elements which are provided so as to freely rotate between the outer ring raceway and the inner ring raceway, the device comprising:
a housing;
a lubricant reservoir which is provided inside the housing and which is configured so as to retain lubricant in which a portion of the radial rolling bearing is immersed;
a rotary shaft which is supported so as to freely rotate inside the housing and which the inner ring of the radial rolling bearing is fitted outside;
a rotational driving section which is configured so as to rotate the rotary shaft;
a load applying section which includes a pressurizing device and is configured so as to apply a load to the radial rolling bearing; and
a vibration sensor which is configured so as to detect a vibration in the radial rolling bearing,
wherein:
the vibration sensor is provided on an outside of the housing, and between the pressurizing device and the radial rolling bearing in a direction in which the load applies,
the housing is configured so as to support the rotary shaft at two positions, which are separated in the axial direction, via a pair of radial rolling bearings, the device further comprises:
a movable housing which is disposed concentrically to the rotary shaft in a periphery of the rotary shaft and which is provided in a state where a displacement in a radial direction is possible and a displacement in a rotation direction is prevented with respect to the housing; and
a support bearing which is provided between an inner peripheral surface of the movable housing and a portion of an outer peripheral surface of the rotary shaft between the pair of radial rolling bearings,
the pressurizing device includes a pressing rod which has a leading end surface, the load applying section further includes a pressing jig which has a base end surface and a leading end surface that abuts against an outer peripheral surface of the movable housing, and a steel ball which is provided between the base end surface of the pressing jig and the leading end surface of the pressing rod, the load applying section further includes a pressing plate, the pressing plate is provided between the base end surface of the pressing jig and the steel ball, the vibration sensor is attached to a side surface of the pressing plate at a side at which the pressurizing device is installed, and at a point in time, when a vibration value of the radial rolling bearing which is detected by the vibration sensor exceeds a threshold value that is set to equal or more than 1.5 times and equal to or less than 3 times an initial vibration value at a start of a testing, is set as a life of the radial rolling bearing, and the testing is completed.

\* \* \* \* \*